United States Patent Office 3,453,231
Patented July 1, 1969

3,453,231
STABILIZERS FOR THE POLYPHENYLENE ETHERS
Jan Bussink and Reinier Willem Brussen, Arnhem, Netherlands, assignors to N.V. Polychemie AKU-G.E., Arnhem, Netherlands, a corporation of Netherlands
No Drawing. Filed Feb. 2, 1967, Ser. No. 613,453
Claims priority, application Netherlands, May 18, 1966, 6606803
Int. Cl. C08g 51/60, 43/00
U.S. Cl. 260—45.9                9 Claims

ABSTRACT OF THE DISCLOSURE

A stabilized polyphenylene ether composition consisting of a major portion of a polyphenylene ether and a minor portion of a stabilizing composition containing a phosphorus and boron compound.

---

This invention relates to a polyphenylene ether plastic, and more particularly, to the stabilization of such plastics, with phosphorus and boron compounds.

It is known that the polyphenylene ethers, and particularly, the 2,6-dialkyl substited polyphenylene ethers, are somewhat unstable under the influence of heat and light exposure causing the resin to become dark, brittle and undesirable for many uses. The cause of the degradation is not fully understood, but is believed to be due, in part, to the presence of hydroxyl groups on the polymer chain, a sensitivity to oxygen atmospheres, and the degradative effects of traces of impurities present in the resin composition.

The term "polyphenylene ether" includes those polymers disclosed in U.S. Patents Nos. 3,306,874 and 3,306,875 of Allan S. Hay, and the polymers disclosed in U.S. Patents Nos. 3,257, 357 and 3,257,358 of Gelu Stoeff Stamatoff (all incorporated herein by reference), and the various copolymers and blends of the polyphenylene ethers formed by copolymerizing or blending the polyphenylene ethers with other monomers or polymers such as the polyolefins, polystyrenes, polycarbonates, and the like wherein the polyphenylene ether is present in an amount sufficient to effect the properties of the polymer composition due to the influence of heat and light.

Heretofore, a large number of different compounds such as the phenolic antioxidants exemplified by p-phenyl-phenol, N-steroyl-p-aminophenol and 2,2'-methylene-bis-(4-ethyl-6-tert. butylphenol) have been used as heat and light stabilizers for the polyphenylene ethers. These stabilizers were generally unsatisfactory for even short exposure. Other stabilizers such as the ketenes, benzoic anhydride and the mercaptobenzimidazoles have been tried and found to be effective for short periods of exposure to heat, but not for the relatively long exposures required for many commercial applications.

It has now been found that the stabilizing combination of phosphorus and boron compounds added to a polyphenylene ether results in a polymer having excellent stability to heat and light. It has also been found that the effectiveness of the stabilizing combination is far superior to that which might be expected from the effect of each of the components used individually.

The phosphorus compounds that may be used are those corresponding to the formula (I)                $O_nPXYZ$ where $n$ is a whole integer equal to 0 or 1; X represents a member selected from the group consisting of OR, SR or $N(R)_2$ where R represents a substituted or unsubstituted alkyl groups; and Y and Z represent the groups OR', SR' and $N(R')_2$ where R' is the same as R and in addition, hydrogen.

Examples of phosphorus compounds corresponding to Formula I include: triethylphosphite, trimethylthiophosphite, hexamethylphosphorustriamide, tetramethylphosphorusdiamide, tetramethylchloromethylphosphorusdiamide, etc.

Phosphoric acid amides having one or more nitrogen atoms forming part of a closed chain, such as tributylenephosphorustriamide, and phosphoric acid amides derived from polyamines, such as ethylene-di-(phosphorus amides) may also be used.

Polymeric phosphorus compounds at the above-mentioned type, in which the phosphorus atoms are interlinked by means of oxygen or sulphur atoms, such as esters and amides of polyphosphoric acids, for example, cyclic polyphosphates and higher linear phosphates, may also be used.

The boron compound may be boron oxide, a boron ester or a boric acid including acids in which two oxygen atoms are linked, for example, by means of a carbon chain and heterocyclic boric acid compounds in which the boron atoms are linked by means of oxygen atoms such as, for example, the trialkoxyborine compounds.

In a preferred embodiment of this invention, the stabilizer comprises:

(1) A phosphorus compound that is a hexalkylphosphorustriamide of the formula:

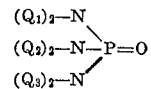

wherein $Q_1$, $Q_2$ and $Q_3$ represent alkyl groups having from 1 to 6 carbon atoms; and (2) A boron compound selected from the group consisting of (a) boron oxide ($B_2O_3$)
(b) boron acids of the formula:

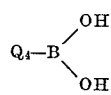

wherein $Q_4$ is a member selected from the group consisting of hydroxyl, alkyl having from 1 to 15 carbon atoms and monocyclic aryl;
(c) boron esters of the formula:

wherein $Q_5$, $Q_6$ and $Q_7$ are members selected from the group consisting of hydrogen, alkyl having from 1 to 20 carbon atoms and monocyclic aryl, provided that at least one of said $Q_5$, $Q_6$ and $Q_7$ be other than hydrogen, and (d)

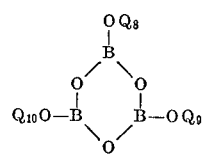

wherein $Q_8$, $Q_9$ and $Q_{10}$ are lower alkyl.

Typical boron acids, corresponding to the formula set forth in subparagraph (b) above, are, for example, boric acid, methyl boric acid, ethyl boric acid, butyl boric acid, hexyl boric acid, phenyl boric acid, methylphenyl boric acid, xylyl boric acid, 2,2′-dimethylheptyl boric acid, 2-methyl-3-ethyloctyl boric acid, etc.

Typical examples of boron esters, corresponding to the general formula set forth in subparagraph (c) above, are, for example, trimethyl borate, dimethylethyl borate, tri-n-propyl borate, tri-i-butyl borate, tricyclohexyl borate, methylpropyl-n-cyclohexyl borate, methyldiphenyl borate, tri-n-octyl borate, triphenyl borate, diphenyl borate, 2,3-dimethylpentyl-n-butyl borate, tri-n-nonyl borate, dicyclohexyl-2-methyl-4-tert. butyloctyl borate, tridodecyl borate, trioctadecyl borate, 3-propylheptylmethyl borate, etc.

The amount of stabilizer added to the polyphenylene ether depends upon the activity of the stabilizer, the quality of the polymer to be stabilized, and the conditions to which the polymer is to be exposed. The content of each of the components in the stabilizer should equal at least 0.1% by weight. The total stabilizer content may vary between about 0.02 and about 10% by weight calculated on the polymer, and preferably, between 0.2 and 4.0% by weight, calculated on the polymer. The quantity of the phosphorous compound used in the stabilizer combination should at least equal the quantity of the boron compound, and in a preferred embodiment, the phosphorous should be used in an amount equal to at least twice the boron compound.

The manner of adding the stabilizer to the polyphenylene ether is not critical to the invention. Hence, any convenient method can be employed. For example, the stabilizer can be blended with resin powder in a blender such as a Waring Blendor. Alternatively, the resin can be dissolved in a suitable solvent and the stabilizer added to the solution.

The stabilized compositions of this invention are useful for all purposes for which the polyphenylene ethers have hitherto been used, for example, for conversion to films, fibers, molded articles and the like, by conventional methods.

The following examples serve to illustrate the invention, but they are not intended to limit it thereto, the parts being by weight unless otherwise stated.

EXAMPLE 1

This example illustrates the method of forming samples of a poly-(2,6-dimethyl-1,4-phenylene)-ether containing a desired quantity of stabilizer for evaluation.

The polyphenylene ether, in powder form, and a desired quantity of stabilizer are mixed together in a Waring Blendor. The resulting mixtures are thereafter extruded at a temperature of 500–600° F., and the extruded strands chopped into pellets. Two gram samples of the pellets are pressed into films by preheating the pellets at a temperature of 550° F. for one minute and thereafter pressing at 550° F. at a pressure of 20,000 p.s.i. for one minute. The resulting films are ten mils thick. They are allowed to cool and cut into strips measuring approximately ¼ by 4 inches. The stabilizers are evaluated by subjecting a film sample to heat aging in an air circulating oven maintained at 175° C. and determining the time to embrittle. This is determined by folding the film sample at various times during the heat aging period until a film strip embrittles to a point where it snaps when partially folded.

EXAMPLES 2–16

Using the above procedure, a number of samples were prepared illustrating the various stabilizer systems defined above. The compositions of the samples and the time to embrittle are set forth in Table 1 below.

TABLE 1

| Example No. | Stabilizer composition | Time to embrittle (hrs.) |
|---|---|---|
| 2 | Control (no additives) | 30 |
| 3 | 2.0% hexamethylphosphoric triamide | 60 |
| 4 | 1.0% hexamethylphosphoric triamide, 0.5% $B_2O_3$ | 90 |
| 5 | 1.0% hexamethylphosphoric triamide, 1.0% $B_2O_3$ | 120 |
| 6 | 2.0% hexamethylphosphoric triamide, 1.0% $B_2O_3$ | 150 |
| 7 | 4.0% hexamethylphosphoric triamide, 1.0% $B_2O_3$ | 245 |
| 8 | 1.0% hexamethylphosphoric triamide, 0.5% boric acid | 85 |
| 9 | 1.0% hexamethylphosphoric triamide, 1.0% boric acid | 110 |
| 10 | 2.0% hexamethylphosphoric triamide, 1.0% boric acid | 145 |
| 11 | 1.0% hexamethylphosphoric triamide, 2.0% trioctylborate | 140 |
| 12 | 4.0% hexamethylphosphoric triamide, 2.0% trioctylborate | 190 |
| 13 | 2.0% hexamethylphosphoric triamide, 2.0% tripentylborate | 165 |
| 14 | 2.0% hexamethylphosphoric triamide, 2.0% tridecylborate | 165 |
| 15 | 2.0% hexamethylphosphoric triamide, 2.0% triisobutylborate | 165 |
| 16 | 2.0% hexamethylphosphoric triamide, 2.0% phenylboric acid | 175 |

EXAMPLES 17–28

Using the polymer of Example 1, samples were prepared by adding polymer and stabilizer to dioxane or acetone and subsequently evaporating the solvent.

From the polymer containing the various stabilizers, 250μ thick film strip were prepared by pressing the polymer powder between two metal plates heated to 270° C. The film strips were placed in a drying oven which was heated, respectively to 150° C., and 175° C. in air. After a specified time, the flexibility of the film strips was determined by folding the strips through 180° and tightly pressing the folded halves between finger and thumb. Thereafter, one half of the strip is bent through 360° without pressing the halves together. Repeated bending through 360° is continued until the film strip breaks. The number of bends is defined as the fold number.

The following table illustrates fold number after heating at 150° C. for various samples:

TABLE 2

| Example No. | Stabilizer composition | Fold number 0 hrs. | Fold number 120 hrs. |
|---|---|---|---|
| 17 | Control (no additive) | 24 | 1 |
| 18 | 1.0% p-phenylphenol | 24 | 1 |
| 19 | 1.0% $B_2O_3$ | 20 | 1 |
| 20 | 0.5% hexamethylphosphorous triamide, 0.5% $B_2O_3$ | 22 | 4 |
| 21 | 0.5% hexamethylphosphorus triamide, 0.5% tricyclohexyl-borate | 24 | 5 |

The following table illustrates fold number for various samples after heat treatment at 175° C.:

TABLE 3

| Ex. No. | Stabilizer composition | Fold number 0 hrs. | 96 hrs. | 144 hrs. | 192 hrs. |
|---|---|---|---|---|---|
| 22 | Control (no additive). | 20 | 1 | 0 | 0 |
| 23 | 2.0% $B_2O_3$ | 18 | 1 | 0 | 0 |
| 24 | 2.0% hexamethyl-phosphorus triamide. | 22 | 3 | 1 | 0 |
| 25 | 2.0% tricyclo-hexyl-borate. | 20 | 1 | 0 | 0 |
| 26 | 1.0% hexamethyl-phosphorus triamide, 1.0% $B_2O_3$. | 20 | 7 | 4 | 2 |
| 27 | 1.0% hexamethyl-phosphorus triamide, 1.0% tricyclohexyl borate. | 22 | 7 | 5 | 3 |
| 28 | 1.0% hexamethyl-phosphorus triamide, 1.0% trimethoxyboroxine. | 22 | 6 | 5 | 3 |

It should be understood that the invention is susceptible to further modification within the scope of appended claims.

What we claim as new and desire to secure by Letters Patent of the United States is:

1. A stabilized polyphenylene ether composition consisting of a major portion of a polyphenylene ether and a stabilizing quantity of a stabilizer consisting essentially of:

(1) a hexaalkylphosphorus triamide having the general formula:

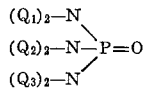

wherein $Q_1$, $Q_2$ and $Q_3$ represent alkyl groups having from 1–6 carbon atoms; and (2) a boron compound selected from the group consisting of
   (a) boron oxide
   (b) a boron acid of the formula

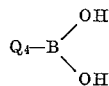

wherein $Q_4$ is a member selected from the group consisting of hydroxy, alkyl having from 1–15 carbon atoms, and monocyclic aryl; and (c) a boron ester of the formula

wherein $Q_5$, $Q_6$ $Q_7$ are members selected from group consisting of hydrogen, alkyl having from 1–20 carbon atoms and monocyclic aryl, provided that at least one of said $Q_5$, $Q_6$ and $Q_7$ be other than hydrogen; and (d)

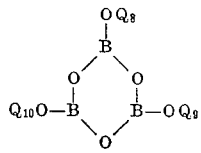

wherein $Q_8$, $Q_9$ and $Q_{10}$ are lower alkyl.

2. The stabilized polyphenylene ether composition of claim 1 wherein the polyphenylene ether is poly-(2,6-dimethyl-1,4-phenylene)-ether.

3. The stabilized polyphenylene ether composition of claim 1 wherein the stabilizer constitutes 0.02 to 10% by weight of the composition, calculated on the polymer.

4. The composition of claim 1 wherein the stabilizer constitutes from 0.2 to 4.0% by weight of the composition, calculated on the polymer.

5. The composition of claim 1 wherein the hexaalkyl-phosphorustriamide is hexametylphosphorustriamide and the boron compound is boron oxide.

6. The composition of claim 1 wherein the hexaalkyl-phosphorustriamide is hexamethylphosphorustriamide and the boron compound is boric acid.

7. The composition of claim 1 wherein the hexaalkyl-phosphorustriamide is hexamethylphosphorustriamide and the boron compound is phenylboric acid.

8. The composition of claim 1 wherein the hexaalkyl-phosphorustriamide is hexamethylphosphorustriamide and the boron compound is tridecylborate.

9. A stabilizer composition consisting of
(1) a hexaalkylphosphorustriamide having the general formula:

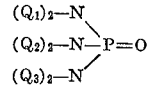

wherein $Q_1$, $Q_2$, and $Q_3$ represent alkyl groups having from 1–6 carbon atoms; and (2) a boron compound selected from the group consisting of
   (a) boron oxide
   (b) a boron acid of the formula

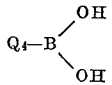

wherein $Q_4$ is a member selected from the group consisting of hydroxy, alkyl having from 1–15 carbon atoms, and monocyclic aryl; and (c) a boron ester of the formula

wherein $Q_5$, $Q_6$ and $Q_7$ are members selected from the group consisting of hydrogen, alkyl having from 1–20 carbon atoms and monocyclic aryl, provided that at least one of said $Q_5$, $Q_6$ and $Q_7$ be other than hydrogen; and (d)

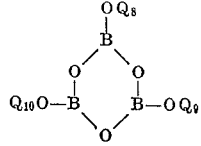

wherein $Q_8$, $Q_9$ and $Q_{10}$ are lower alkyl.

References Cited

UNITED STATES PATENTS

| | | | |
|---|---|---|---|
| 3,082,192 | 3/1963 | Kirshenbaum | 260—45.7 |
| 3,244,662 | 4/1966 | Strauss et al. | 260—45.7 |
| 3,257,358 | 6/1966 | Stamatoff | 260—47 |
| 3,306,875 | 2/1967 | Hay | 260—47 |
| 3,345,326 | 10/1967 | Chang et al. | 260—45.8 |

HOSEA E. TAYLOR, Jr., *Primary Examiner.*

U.S. Cl. X.R.

252—400, 403; 260—45.7, 462, 959